US00RE40039E

(19) United States
(12) Reissued Patent
Tsukuda et al.

(10) Patent Number: US RE40,039 E
(45) Date of Reissued Patent: Jan. 29, 2008

(54) AROMATIC POLYAMIDE RESIN MOLDINGS, PRODUCTION METHODS THEREOF, AND MAGNETIC RECORDING MEDIUM PRODUCED THEREFROM

(75) Inventors: Akimitsu Tsukuda, Kyoto (JP); Masanori Sueoka, Otsu (JP); Toshihiro Tsuzuki, Kyoto (JP)

(73) Assignee: Toray Industries, Inc. (JP)

(21) Appl. No.: 10/640,605

(22) PCT Filed: Aug. 29, 1997

(86) PCT No.: PCT/JP97/03036

§ 371 (c)(1),
(2), (4) Date: Apr. 28, 1998

(87) PCT Pub. No.: WO98/08892

PCT Pub. Date: Mar. 5, 1998

Related U.S. Patent Documents

Reissue of:
(64) Patent No.: 6,274,220
Issued: Aug. 14, 2001
Appl. No.: 09/066,312
Filed: Apr. 28, 1998

(30) Foreign Application Priority Data

Aug. 29, 1996 (JP) ..... 8-229019
Aug. 29, 1996 (JP) ..... 8-229020

(51) Int. Cl.
*G11B 5/73* (2006.01)
*G11B 5/78* (2006.01)

(52) U.S. Cl. ..... 428/141; 428/323; 428/458; 428/474.4; 428/477.7; 428/847.8; 156/242; 156/244.24

(58) Field of Classification Search ..... None
See application file for complete search history.

(56) References Cited

U.S. PATENT DOCUMENTS

| | | | |
|---|---|---|---|
| 4,645,702 | A | 2/1987 | Asakura et al. |
| 5,686,166 | A | 11/1997 | Tsukuda et al. |
| 5,780,387 | A | 7/1998 | Harada |
| 5,886,819 | A | 3/1999 | Murata et al. |

FOREIGN PATENT DOCUMENTS

| | | | |
|---|---|---|---|
| EP | 0 702 359 | * | 3/1996 |
| EP | 0702359 | | 3/1996 |
| EP | 0702361 | | 3/1996 |
| EP | 0 702 361 | * | 3/1996 |
| EP | 0842754 | | 5/1998 |
| EP | 0 842 754 | * | 5/1998 |
| EP | 882759 | A1 | 12/1998 |
| JP | 60127523 | A | 7/1985 |
| JP | 01247162 | A | 10/1989 |
| JP | 10265589 | A | 10/1998 |
| JP | 11003513 | A | 1/1999 |
| JP | 11106529 | A | 4/1999 |

OTHER PUBLICATIONS

Questrel–Orbit QWEB search (pp. 1–13).*
PATNO 6274220 search (pp. 1–7).*

* cited by examiner

*Primary Examiner*—Kevin M. Bernatz
(74) *Attorney, Agent, or Firm*—DLA Piper US LLP

(57) ABSTRACT

The present invention provides aromatic polyamide resin moldings comprising at least one surface that is 1.0 nm or more in root-mean-square roughness and is 80 nm or less in 10-point average roughness, both of the roughness being as determined by atomic force microscopy, and that is 9.8 GPa or more in tensile Young's modulus at least in one direction. Such aromatic polyamide resin moldings serve effectively as material for film, film for magnetic recording medium in particular, that is highly resistant to scraping and has highly uniform surface protrusions.

20 Claims, No Drawings

AROMATIC POLYAMIDE RESIN MOLDINGS, PRODUCTION METHODS THEREOF, AND MAGNETIC RECORDING MEDIUM PRODUCED THEREFROM

Matter enclosed in heavy brackets [ ] appears in the original patent but forms no part of this reissue specification; matter printed in italics indicates the additions made by reissue.

TECHNICAL FIELD

The present invention relates to *an* automatic polyamide resin [moldings] *molding* having fine protrusions uniformly distributed over [their] *its* surface, particularly aromatic polyamide film that can be suitably used as *a* magnetic recording medium.

BACKGROUND ART

With high heat resistance and good mechanical properties, aromatic polyamides have various potential uses in the form of fiber, film, and aramid paper. Para-oriented aromatic polyamides, in particular, [are] *have* higher [in] rigidity, strength, and mechanical properties than other polymers, and *are* widely known as [the material] *materials* for high-strength fibers such as "Kevlar". When used as [material] *materials* for [film] *films*, they can produce very thin products, with potential [ones] *uses* including printer ink ribbon, magnetic tape, and capacitors. Aromatic polyamides [with] *having* better surface properties including running performance and abrasiveness are now demanded as more rapid processes for aromatic polyamide processing are adopted[such as]. *They are used* for producing coated-type or metal thin magnetic layers in magnetic recording [medium] *media* and forming image transfer layers for thermal recording. As magnetic recording medium products have been decreased in size and increased in recording density, formation of uniform, fine protrusions over the surface of aromatic polyamide film, which acts as the base film, is required to ensure a good balance among the output characteristics, running properties, and durability of the resulting magnetic recording medium. In the recently-developed magnetic recording medium consisting of a metal thin magnetic layer, in particular, the surface characteristics of the base filter can have *a* large influence on the surface characteristics of the magnetic layer, and this has increased the demands for such good base film materials.

Compared to aromatic polyimides and polyesters such as polyethylene terephthalate and polyethylene [naptha late] *naphthalate* that have been conventionally used as base [film] *films* of magnetic recording [medium] *media*, aromatic polyamide film can be very thin due to its high rigidity and therefore is very suitable [material] for *use in* high-capacity magnetic recording [medium] *media*. The major difference from [the] polyester film which is produced by melt casting process is that *an* aromatic polyamide film is produced by *a* solution casting process. Compared to *an* aromatic polyimide film which is produced by solution casting process, aromatic polyamide film is also very different in [the] pH variations during the film forming process and in that polymerizing [solutions] *solution* contains inorganic salts in many cases, requiring particular care for *conducting* the desolvation step in the film forming process. Thus, special techniques suitable for aromatic polyamides have to be developed to solve these problems.

The use of inorganic particles contained in aromatic polyamide film is known as a technique to produce fine protrusions over the surface (e.g., Japanese Laid-Open Patent Applications (Kokai) [SH0] *SHO*60-127523 and SHO60-201914). Another known example is [a] *an* aromatic polyamide film consisting of a base layer laminated with a thin layer containing particles for producing surface protrusions (eg., Japanese Laid-Open Patent Applications (Kokai) HEI3-119512).

However, above-mentioned conventional aromatic polyamide films containing (inorganic or other) particles as major component of the surface protrusions have three serious basic problems as described below.

First, if inorganic or other foreign particles with different properties are added to aromatic polyamide to form surface protrusions, the affinity with the inorganic material may be reduced due to the strong intermolecular force of aromatic polyamide, which will cause removal of protrusions, and the film surface may become liable to scraping or other damage that will decrease the abrasion resistance of the film surface.

Second, finer protrusions have been increasingly required in recent years, as described above, and film containing smaller-diameter particles [is tend] *tends* to be used to meet this requirement. However, as the diameter of *the* particles [contained] decreases, the repulsion among particles decreases, *tending* to cause their coagulation, resulting in [a] decreased uniformity of [the] distribution of protrusions and an increased number of large protrusions. This is an essential [problems] *problem* arising from [then] *the* mixing of aromatic polyamide with particles of a foreign nature, and this problem cannot be avoided completely when solid particles, organic or inorganic, are used. Furthermore, aromatic polyamide during the process for preparing the polymer solution is liable to suffer large changes in pH of the solution to accelerate the coagulation of particles. Thus, the use of aromatic polyamide is disadvantageous regarding this particle coagulation.

Third, during such a processing as stated above or during the use of a final product, aromatic polyamide film may often [travels] *travel* along guide rolls or guide pins, but the protrusions consisting of particles [contained] are generally so high in hardness that the surface of the guide will be scraped to produce dust which in turn will fall on the film. This problem will be particularly serious if the guide is made of [plastics] *a plastic* or if the film travels along it rapidly and repeatedly.

Japanese Laid-Open Application (Kokai) HEI 8-255332 has disclosed a magnetic recording medium consisting of a magnetic layer formed over a non-magnetic support with a prescribed surface roughness. The material for the support actually disclosed, however, is polyester film, instead of aromatic polyamide film. Further, no specific methods for preparing the surface of the support are virtually disclosed, and the only description regarding surface preparation is that it is done by adjusting the film formation conditions for surface smoothing and by adjusting the size and density of the particles added, which cannot work effectively enough to solve the above-mentioned problems.

Japanese Laid-Open Application (Kokai) HEI 3-237135 has disclosed heat resistant film consisting of aromatic polyamide and soluble resin with the content of the soluble resin being in the range of 10 wt % to 95 wt %. This, however, aims at enhancement of the chemical properties and cost reduction, and there is no description or suggestion regarding a technical idea to produce a surface with a fine texture. Further, the content of the soluble resin is large compared to aromatic polyamide, reducing the good mechanical properties, the high Young's modulus in particular, characteristic of aromatic polyamide. For instance, the one with the highest Young's modulus described in Examples in the Application is only 6.2 GPa (Example 2). Similar inventions are disclosed in Japanese Laid-Open Application (Kokai) HEI 3-286680, HEI 3-227290, HEI 4-117433, and HEI 4-27110, but they have similar problems.

Japanese Laid-Open Application (Kokai) HEI 7-44857 has disclosed a film consisting of a magnetic surface with a special fine texture that is produced by blending two aromatic polyamide components, one being the major component and the other being the minor component different from the former and lower in solubility, followed by a molding process in which the minor component aromatic polyamide is deposited on the surface. However, aromatic polyamides, particularly para-oriented ones, generally are not high in solubility, and if an aromatic polyamide is blended with another which is still lower in solubility, it will be difficult for them to mix completely to form a homogeneous polymer solution, even though complete dissolution seems apparent. A study by the present inventors has shown that film produced from such a polymer solution contains many rough protrusions with a height of 150 nm or more, despite the coexistence of fine protrusions, and that the surface tends to have crater-like dents that cause surface roughness. It has also been shown that if two aromatic polyamide components, major [Ad] and minor, that are very similar in structure and consequently nearly the same in solubility are blended, they seem to mix with each other completely and only a few protrusions are formed. Therefore, it is difficult for the technique disclosed in the Application to produce uniformly-distributed fine protrusions.

Japanese Laid-Open Application (Kokai) SHO 59-122547 has an disclosed a polyimide resin composition with good slip characteristics that is produced by adding a resin containing a sulfone group to an aromatic polyimide up to 0.01 wt % to 10 wt %. However, aromatic polyimide and aromatic polyamide show very different characteristics when, for instance, in the form of film, so the technique belongs to a different technical field.

Japanese Laid-Open Application (Kokai) HEI 4-8763, which relates to methods for producing aromatic polyamide/polyethersulfone composition, has disclosed the technique of adding polyethersulfone prior to the completion of the aromatic polyamide polymerization. There is no description, however, regarding the properties of resulting moldings (e.g., film), let alone methods to design or produce a surface with a specific texture, and no example in the Application refers to a molding process such as for film formation.

The primary object of the present invention is to provide aromatic polyamide resin moldings with virtually uniform, fine surface protrusions that are difficult to destroy because of their very high affinity with aromatic polyamide compared to those formed in conventional methods, which are realized, virtually not by addition of particles, but by microscopic-level separation, during the molding process, of the aromatic polyamide from the dissimilar polymer which, in the solution, is compatible with the former or in a dissolved state.

DISCLOSURE OF THE INVENTION

The present invention provides aromatic polyamide resin moldings, film in particular, at least one of whose surfaces [is] *has* 1.0 nm or more [in] root-mean-square roughness as observed by atomic force microscopy, and 80 nm or less [in] *expressed as a* ten-point mean, with a tensile Young's modulus of 9.8 GPa or more at least in one direction, *and relates to* production methods thereof, and magnetic recording [medium] *media* produced therefrom.

BEST MODE FOR CARRYING OUT THE INVENTION

Moldings of the present invention[s] that [are] *have* 1.0 nm or more [in] root-mean-square roughness (denoted as Rq hereinafter), as observed by atomic force microscopy as described later and 80 nm or less [in] *expressed as a* ten-point mean (denoted as Rz hereinafter) can form uniform, fine protrusions when molded, and magnetic recording [medium] *media*, particularly those with a metal evaporated magnetic layer, produced from such moldings [will have] *has* small spacing loss with *the* head, *and* therefore, [will have] *has* good out put characteristics, and [will have] *has* good running properties and high durability due to [a] suitable roughness. An Rq *value* of less than 1.0 nm may lead to a loss of good slip characteristics, failure [inwindingup fi lmor] *in winding up film or* other products during their production, failure in conveying film during its processing, or reduced durability of magnetic recording medium produced. The Rq value should preferably be 2.0 nm [or more and] *to* 10 nm [or less], more preferably 2.5 nm [or more and] *to* 8.0 nm [or less]. An Rz *of* more than 80 nm may lead to a rough surface, defective coating in thermal copying material and magnetic recording medium, or a loss in the output characteristics of magnetic recording medium produced. The Rz value should preferably be 60 nm or less, more preferably 50 nm or less, further more preferably 40 nm. The lower limit is generally about 10 nm.

Moldings of the present invention [has] *have* a tensile Young's modulus of 9.8 GPa or more at least in one direction. If the Young's modulus is less than 9.8 GPa in [any] *all* direction, they may suffer a loss in processability or products may fail to have good properties. When used as *a* thin base for *a* magnetic recording medium, in particular, meeting the above-mentioned requirements is important in [obtaining] *making a* high-output magnetic recording medium. The Young's modulus *values* should preferably be 11.7 GPa, more preferably 12.7 GPa, at least in one direction. Needless to say, the Young's modulus should preferably be 9.8 GPa in all directions. To meet these requirements, the para-oriented aromatic rings should account for preferably 50%, more preferably 75%, further more preferably 80%, still further more preferably 90%, of all aromatic rings contained in the aromatic polyamide to be used for the invention. Moreover, a dissimilar polymer as described later should be contained preferably up to less than 10 wt % of the total weight of the aromatic polyamide and [it] dissimilar polymer.

For the [surface] *surfaces* of moldings of the invention, the non-particle index for protrusions of 5 nm or more [high] should preferably be 80% or more, more preferably 85% or more, further more preferably 95% or more, still further more preferably 99% or more. Thus, surface protrusions as referred to in the present invention should preferably be formed through, for instance, phase separation between the aromatic polyamide and *a* dissimilar polymer as described below, instead of being formed by [using] *adding* particles. The aromatic polyamide and dissimilar polymer in a solution may be in a [complete] *completely*, or nearly [complete] *completely*, miscible state, but will form surface protrusions if phase separation is caused during the molding process. This virtually avoids the formation of large or non-uniform protrusions due to particle coagulation, which is an inherent problem with the addition of solid particles for protrusion formation. Since the aromatic polyamide and dissimilar polymer in a solution may be in a complete, or nearly complete, miscible state, as stated above, their mutual adhesion is strong after being molded, making removal of or damage to protrusions difficult [to occur] when an external force is applied[, and]. *Further,* the hardness of the protrusions is lower than those formed by particle addition, protecting the rolls and guides from scraping during the manufacturing process or during the use of final [products] *product*.

For aromatic polyamide resin moldings of the present invention, the average height of the surface protrusions divided by their average diameter, hereinafter referred to as HD, should preferably be in the range from 1/40 to 1/2, more preferably 1/30 to 1/3, further more preferably 1/20 to 1/4. An HD value of[.] less than 1/40 may lead to a deterioration in the running properties of film products, while an HD value of more than 1/2 may lead to the formation of steep protrusions which may cause damage to rolls, or may be damaged themselves, during production or processing of film products, etc.

The average diameter of such protrusions as described above should preferably be 30 nm [or more and] *to* 300 nm [or less], more preferably 50 nm or more and 200 nm or less, further more preferably 50 nm or more and 150 nm or less. The average diameter referred to herein is defined as the average of the size of each surface protrusion along its short and long axis. An average diameter less than 30 nm may lead to deformation of protrusions when an external force is applied during film production or processing, while material with an average diameter more than 300 nm may cause noise when used as support for a magnetic recording medium.

If the maximum protrusion roughness, hereinafter referred as Rt, of the surface of moldings of the present invention, is 20 times or less the average roughness, hereinafter referred as Ra, the friction coefficient is maintained constant over a very small area, leading to good contact with rolls and guide pins during conveyance of moldings or during the use of final products of magnetic recording medium etc., which can reduce the occurrence of problems due to scraping etc. The above ratio should preferably be 15 or less, more In preferably 10 or less. The lowest limit is about 5 in most cases.

For aromatic polyamide resin moldings of the present invention, furthermore, the number of protrusions of 5 nm or more in height formed over the surface should preferably be $2\times10^5/mm^2$ or more. Protrusions meeting this requirement will ensure good conveyance performance and slit properties during film production etc., and resultant magnetic recording medium, particularly those with a metal-evaporated magnetic layer, will have good running properties and high durability. The number of protrusions should more preferably be $1\times10^6/mm^2$ or more, further more preferably $3\times10^6/mm^2$ or more, still further more preferably $5\times10^6/mm^2$ or more. In addition, it is further preferred that the number of protrusions of 50 nm in height is $2\times10^5/mm^2$ or less and that the sum of the cross-section of each protrusion formed by a horizontal plane at a height of 5 nm account for 0.5 to 20% of the total cross-section. If the number of protrusions of 50 nm or more in height exceeds $2\times10^5/mm^2$, resultant magnetic recording medium maybe low in initial output and may suffer frequent drop-out. Their number should more preferably be $1\times10^5/mm^2$ or less, further more preferably $5\times10^4/mm^2$ or less. If the sum of the cross-section of each protrusion formed by a horizontal plane at a height of 5 nm account for only less than 0.5%, resultant medium may tend to become low in durability as a result of protrusions being scraped off as they slide repeatedly in contact with a head, guide pins, etc. If it is more than 20%, the area of contact with the head, guide pins, etc. will be large, leading to a reduced durability. It should more preferably be 1.0, to 15%, further more preferably 2.0 to 10%, still further more preferably 2.0 to 5.0%.

The number of protrusions of 10 nm or more in height should preferably be $1\times10^5/mm^2$ or more, more preferably $5\times10^5/mm^2$ or more, further more preferably $1\times10^5/mm^2$ or more, and the sum of the cross-section of each protrusion formed by a horizontal plane at a height of 10 nm should preferably account for 0.01 to 10%, more preferably 0.05 to 8%, further more preferably 0.1 to 7%, of the total cross-section to ensure enhanced electromagnetic conversion characteristics and durability.

The number of protrusions of 15 nm or more in height should preferably be $2\times10^4$/[mm 2] $mm^2$ or more, more preferably $5\times10^4/mm^2$or more, further more preferably $1\times10^5/mm^2$ or more, and the sum of the cross-section of each protrusion formed by a horizontal plane at a height of 15 nm should preferably account for 5% or less, more preferably 3% or less, further more preferably in the range of 0.001 to 3%, of the total cross-section to ensure further enhanced electromagnetic [transducing] *conversion* characteristics and durability.

To ensure the formation of uniform, fine protrusions over the surface, aromatic polyamide resin moldings of the present invention should preferably have such a composition as described below.

First, regarding *the* aromatic polyamide, the aromatic polyamide component of aromatic polyamide resin moldings of the invention should have a repeating unit as represented by general formula (I) and/or general formula (II) described below.

General Formula (I)

$$-(NH-Ar_1-NHCO-Ar_2-CO)-$$

General Formula (II)

$$-(NH-Ar_3-CO)-$$

where $Ar_1$, $Ar_2$, and $Ar_3$ may be, for instance:

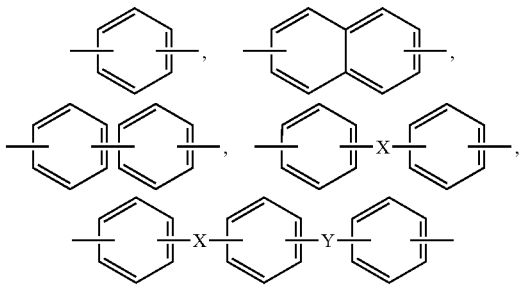

and X and Y may be selected from, but not limited to, the group of —O—, —$CH_2$—, —CO—, —$SO_2$—, —S—, and $C(CH_3)_2$—. One or more of the hydrogen atoms on their aromatic ring may be replaced with a halogen atom such as fluorine, chlorine, and bromine (preferably chlorine), an alkyl group such as nitro, methyl, ethyl, and propyl (preferably methyl), or an alkoxy group such as methoxy, ethoxy, propoxy, and isopropoxy. In addition, one or more hydrogen atoms in the amide bond that forms the polymer may be replaced by a substituent. For enhanced characteristics, *the* above-mentioned aromatic rings that are bonded in para-orientation should preferably account for 50% or more, more preferably 75% or more, further more preferably 80% or more, still further more preferably 90% or more, of the total aromatic rings that are contained in the polymer to provide film with a high rigidity and high heat resistance. Para-orientation referred to herein is defined as the state where the bivalent bonds on the aromatic nuclei in the backbone chain are aligned parallel [a] to each other or [coaxial ly] *coaxially*. It is preferred that 30% or more of the total aromatic rings is accounted for by those in which one or more of the hydrogen atoms on the aromatic rings has been replaced with a halogen atom (preferably chlorine), as they will have enhanced characteristics in terms of increased moisture resistance, reduced dimensional fluctuation caused by moisture absorption, and will prevent the rigidity reduction.

A dissimilar polymer as referred to herein is a polymer consisting of repeating units that are different from those in the above aromatic polyamide. One or more of such polymers may be used. They should preferably be [contained] *present* up to 0.1 wt % or more and less than 10 wt % relative to the total weight of aromatic polyamide and dissimilar polymer(s), as virtually uniform, fine protrusions will be formed in great numbers over the surface of the moldings. If their content is less than 0.1 wt %, protrusions will not be formed or, if formed, will be very small in number and height. If their content is more than 10 wt %, the domain of the dissimilar polymers formed through phase separation will be so large that the resultant surface protrusions will be too large in height and diameter to meet the requirements of the present [invent ion] *invention*. In addition, a content more than 10 wt % will allow the dissimilar polymers to occupy a large area, resulting in peeling at the interface with the aromatic polyamide that may reduce the toughness of the aromatic polyamide resin [A] moldings or cause a deterioration of the high rigidity and high resistance characteristic of aromatic polyamide. The content of dissimilar polymers should be appropriately fixed depending on [then] *the* type, solubility, molecular weight, etc., of the aromatic polyamide and dissimilar polymers used, and the size of the target moldings, etc., but it should preferably be 0.5 wt % or more and 8 wt % or less, more preferably 1 wt % or more and 6 wt % or less.

The types of such dissimilar polymers to be used should be selected depending on the design of the target surface, and there *are* no special limits on them. To meet the objectives of the invention, however, it is preferred that they meet the following formulae where δa is the solubility parameter of aromatic polyamide and δb is the solubility parameter of the dissimilar polymer contained.

$$50(\mathrm{MJ/m^3})^{1/2} \leqq \delta a \leqq 70(\mathrm{MJ/m^3})^{1/2}$$

$$2(\mathrm{MJ/m^3})^{1/2} \leqq |\delta a - \delta b| \leqq 20(\mathrm{MJ/m^3})^{1/2}$$

The solubility parameter used herein is calculated from the method proposed by Fedors (calculation process is shown, for instance, in Properties of Polymers, chapter 7, written by D. W. VanKreveren, 1976, Elsevier). For aromatic polyamides and dissimilar polymers of some special structures, the parameter cannot be calculated by the Fedors' method because the parameter concerning a chemical species contained is not known. In such a case, the parameter of a similar chemical species is used (for instance, the parameter for [—$SO^2$—] —$SO_2$— is not known, so the parameters for —S—, —O—, and —O— are used instead). The solubility parameter roughly indicate the [in] relative compatibility among different dissimilar polymers, and if δa and δb meet the above requirements, the size of the dispersed phase is controlled to allow the surface protrusions to meet the requirements of the present invention favorably. The value of |δa−δb| should preferably meet the following formula:

$$2[(\mathrm{J/m^3})]\ (MJ/m^3)^{1/2} \leqq |\delta a - \delta b| \leqq 16(\mathrm{MJ/m^3})^{1/2}$$

more preferably, $$2\ (\mathrm{MJ/m^3})½ \leqq |\delta a - \delta b| \leqq 12(\mathrm{MJ/m^3})^{1/2}$$

To allow the aromatic polyamide to fully show its inherent high heat resistance and good mechanical properties, it is preferred that the dissimilar polymers are also high in heat resistance, and their glass-transition temperature, or thermal deformation temperature as defined in JIS-D648 when the glass-transition temperature is not apparent, should preferably be 150° C. or more, preferably 200° C. or more.

Such dissimilar polymers include polysulfone, polyethersulfone, polysulfide sulfone, polyphenylene sulfide, polyetherimide, [polyphenyleneoxide] *polyphenylene oxide*, [modifiedpolyphenyleneoxide] *modified polyphenylene oxide*, polyether ketone, polyetherether ketone, polycarbonate, polyethylene terephthalate, polybutylene terephthalate, and polyimide, and their precursor including polyamic acid, polyvinylidene fluoride, polymethyl methacrylate, polystyrene, and polyvinyl alcohol. From the standpoint of [the] uniformity and heat resistance of [surfaceprotrusions] *the surface protrusions* to be formed, it is preferred that at least one of the following polymers are [contained] *present*: aromatic polysulfon polymers including polysulfone, polyethersulfone, and polysulfide sulfone; aromatic polyetherimide polymers; polyphenylene oxide polymers including polyphenylene oxide, and modified polyphenylene oxide; aromatic polyketone polymers including polyether ketone, and polyetherether ketone; polycarbonate polymers; aromatic polyester polymers including polyethylene terephthalate, and polybutylene terephthalate; aromatic polyimide polymers including polyimide and those formed from polyamic acid, precursor for polyimide; of which aromatic polysulfon polymers are preferred most. The aromatic polysulfon polymers referred to herein are those which contain at least one sulfone group, —$SO_2$— in the repeating unit, such as polysulfone produced by condensation polymerization of sodium salt of bisphenol A with 4,4'-dichlorodiphenyl sulfone, or condensation polymerization of potassium salt of 4-(4-chlolophenyl sulfonyl) phenol. Specifically, they include known aromatic [iolysulfon] *polysulfon* polymers that consist of repeating units represented by formulae (III), which may be used alone or in combination.

Formulae (III)

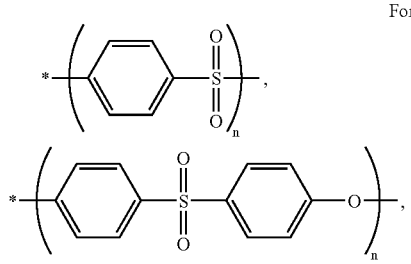

-continued

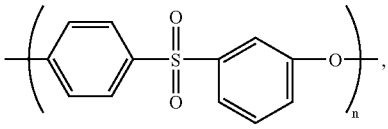

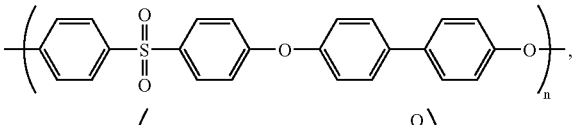

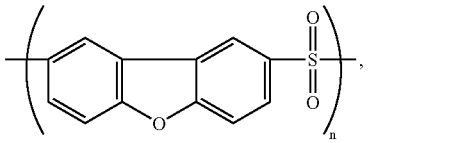

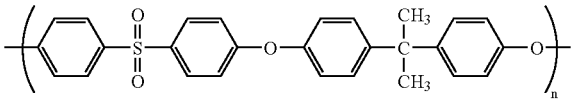

where n denotes a positive integer, which should preferably be 5 or more and 1000 or less to ensure high heat resistance and solubility [a] to organic solvents. Of the structures given above, the one shown below is preferred to produce uniform protrusions:

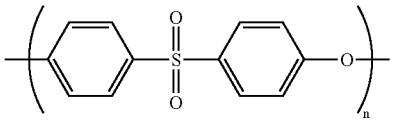

Aromatic polysulfone polymers as listed above should preferably be [contained] *present* up to 0.1% or more and 10% or less, more preferably 0.5% or more and 8% or less, further more preferably 1% or more and 6% or less. Aromatic polysulfone polymers are generally not miscible with aromatic [polyamide] *polyamides*, but the present inventors have found that in a solution, the polymer can be highly compatible with aromatic polysulfone polymers if the latter are used in small amounts, and that uniform protrusions are produced through phase separation between the aromatic polyamide and aromatic polysulfone polymers if film is produced carefully from this solution as described below. If the content is less than 0.1 wt %, resultant protrusions will not *be* sufficient in height and number, and slip properties will be poor, possibly leading to a reduced durability. If it is 10% or more, large protrusions will increase in number, and not only the resultant magnetic recording medium will be poor in electromagnetic conversion [propeprties] *properties*, but also film's mechanical properties may suffer deterioration.

Concerning the method for blending the aromatic polyamide and dissimilar polymer, the dissimilar polymer in the form of [Pellets] *pellets* or powder [maybe] *may be* added, directly or after being dissolved in a solvent, before or after the polymerization of the aromatic polyamide, but it is preferred that the aromatic polyamide and the dissimilar polymer is dissolved in separate solvents which are then blended to provide liquid material for molding. The solvents to be used for dissolving the aromatic polyamide and dissimilar polymer may be different from each other, but they should preferably be the same from the standpoint of industrial advantages including cost and productivity. Useful solvents include such organic solvents as N-methyl-2-pyrolidone, dimethylacetamide, dimethylformamide, hexamethylenephosphoramide, dimethylimidazolidinon, and dimethylsulfone, as well as such mineral acids as concentrated sulphuric acid.

Aromatic polyamide resin moldings of the present invention are suitably produced by [blendingaromaticpolyamide] *blending an aromatic polyamide* and *a* dissimilar [polymers] *polymer* as described above, uniform, fine surface protrusions are formed without adding particles. Depending on their uses, however, the product may contain particles up to 0.0001 to 1.0 wt %. In such cases, the content should preferably be adjusted so that the non-particle index is 80% or more.

Moldings that meet the requirements of the present invention may be produced only by adding particles, instead of adding a dissimilar polymer.

Useful particles, which may be organic or inorganic, include organic polymer particles such as crosslinked polyvinybenzene, acrylate, crosslinkedpolystrene, polyesteri polyimide, polyamide, and fluororesin; inorganic particles such as colloidal silica, titanium oxide, aluminum oxide, zirconium oxide, calcium carbonate, carbon black, and zeolite; particles of any of the above organic polymers that have been processed by such a method as coating with organic material ; and inorganic particles that have been processed by such a method as coating with one of the above polymers. The particle diameter should preferably be in the range of 5 to 100 nm, more preferably 10 to 50 nm, further more preferably 15 to 30 nm. The use of monodisperse particles is preferred. More than one of such particles may be used in combination, and particles of different diameters may be used in combination. Depending on the uses of the product, the content of particles should preferably be 0.0001 to 1.0 wt %, more preferably 0.001 to 0.2 wt %, further more preferably 0.005 to 0.1 wt %, for film products, magnetic recording medium in particular.

For aromatic polyamide resin moldings of the present invention, particles to be used should preferably be spherical and of the same diameter in order to produce uniform protrusions. More specifically, the relative standard deviation $\sigma$ (standard deviation/average particle diameter) of the particle diameter distribution should preferably meet the formula $\sigma \leqq 0.3$, more preferably $\sigma \leqq 0.15$, where the average particle diameter is denoted by D.

Depending on the uses of the product, the number of the above-mentioned particle protrusions on the surface should preferably be $0.1\times10^4/mm^2$ [or more and] *to* $20\times10^4/mm^2$ [or less], more [a] preferably $0.3\times10^4/mm^2$ [or more and] *to* $10\times10^4/mm^2$ [or less], further more preferably $0.7\times10^4/mm^2$ [or more and] *to* $2\times10^4/mm^2$ [or-less]. They may be preferably used as support for magnetic recording medium because they can improve the slip properties.

The average height of the above-mentioned particle protrusions should preferably be 10 nm or more and 75 nm or less, more preferably 20 nm or more and 60 nm of less, further more preferably 30 nm or more and 50 nm or less, to improve the slip properties of the film. Film of the present invention consists of the above-mentioned elements as major components, but inorganic or organic additives including antioxidant, thermal stabilizer, lubricant, ultraviolet absorber, and nucleation agent may be added unless they have an adverse effect on the attainment of the objectives of the present invention.

With their [excel lent] *excellent* surface properties, aromatic polyamide resin moldings of the present invention will be processed into such products as film and in-mold material, but film is most preferred to produce the intended effect of the invention. Studies by the present inventors have also shown that surface protrusions with very high uniformity are formed in the case of thin film of 1 to 20 μm, *preferably 2 to 10 μm* more preferably 2.5 to 7 μm, in [height] *thickness*.

Film of the present invention has a tensile Young's modulus [Ha] of 9.8 GPa or more at least in one direction. This, combined with [excel lent] *excellent* surface properties, makes it possible to provide thin film products that have good processing properties and stability against external force despite their small thickness. In the case of magnetic recording medium, in particular, the output level of magnetic tape increases with the head-tape sliding properties, and therefore it is necessary to develop base film with a high Young's modulus. In particular, a high Young's modulus is required in the longer direction when a fixed head is used for recording, while it is required in the transverse direction when helical scanning is adopted. Base film [with] *having* a Young's modulus less than 9.8 GPa in [any direction] *all directions* is unfavorable because high output is not obtained regardless of the recording mechanism used. For aromatic polyamide film of the present invention, the Young's modulus should preferably be 11.7 GPa or more, more preferably 12.7 GPa, at least in one direction. Needless to say, it is preferred that the Young's modulus is 9.8 GPa or more in all directions.

[Film s] *Film's* elongation should preferably be 10% or more, more preferably 20% or more, further [morepreferably] *more preferably* 30% or more, at least in one direction to achieve a moderate degree of softness.

For magnetic recording, *the* film's moisture absorption coefficient should preferably be 5% or less, more preferably 3% or less, further more preferably 2% or less, to reduce the [tapers] *tape's* expansion and contraction caused by moisture changes, allowing good output properties to be maintained.

For magnetic recording, film's heat shrinkage at 200° C. for 10 minutes should preferably be 0.5% or less, more preferably 0.3% or less, to the [tapers] *tape's* expansion caused by temperature changes, allowing good output properties to be maintained.

Such film may be of a monolayer or a multilayer structure. To produce two-layered film, a solution of polymerized aromatic polyamide is divided into two parts, and two layers are built up after adding a dissimilar polymer to at least one part. The same process applies when film consisting of three or more layers is to be produced. Known methods to produce such a structure include the building up of layers in a die or in a feed block, and production of one layer followed by laminating it with another layer. In the case of *a* multilayer film, [a] *the* film surface of the present invention should preferably be formed as the outmost layer on at least one side of the film.

The present invention provides aromatic polyamide resin moldings from which film with good surface smoothness and running properties can be produced by controlling the height and number of protrusions on the target surface. It is particularly preferred that aromatic polyamide resin moldings of the present invention are used to produce film products, though they also can be processed favorably into fiber and in-mold material. Most preferred film products include external data storage [medium] *media* for computer and tapes for digital video-recording consisting of a thin metal magnetic layer that [is] *are* required to have [a surface] *surfaces* with high-density, highly uniform protrusions, though flexible printed circuit, capacitor, and printer's ink ribbon are also suitable uses.

In particular, when aromatic polyamide film contains an aromatic polysulfone polymer, protrusions with a uniform height can be formed densely over the film surface, making it possible to produce magnetic recording medium with good electromagnetic conversion properties and high durability.

There are no specific limitations [to] *regarding* the product shape, and the magnetic recording medium may be in the form of disk, card, or tape. As it is possible to produce very thin film with good surface properties and *the* high Young's modulus characteristic of the present invention[,]; a particularly preferred product is *a* long, high-density magnetic tape that consists of *a* support produced from film of the present invention *that is* 6.5μm or less in thickness, 2.3 to 13 mm in width, 100 m/roll or more in length, and 8 KB/mm$^2$ in magnetic recording density (uncompressed), because the surface profile can be [control led] *controlled* and [excel lent] *excellent* effects due to high rigidity can be further enhanced. The recording density referred to here is defined as the total recording capacity of a cassette divided by the area (length×width) of the magnetic tape. For magnetic recording medium, such as magnetic tape, there is increased demand recently for smaller, higher-capacity products, but there are important points as described below in producing high-capacity products. First, the thickness of the support should be reduced and the length of the product should be increased so that the total recording capacity is increased. And second, the track width should be reduced and shorter wavelength for recording should be used to increase the recording capacity per unit area. In most cases, both approaches tend to be used. In producing thin support, its material should be high in rigidity as a matter of course, and the surface of the support has greater contribution to the head-tape sliding properties and, in turn, the electromagnetic conversion properties, compared to *a* thicker support. When thick tape is used, the running tension and touch pressure of the head can be set to a high value, and therefore *a* stable contact can be maintained between the head and the tape even if the surface of the support is not [control led] *controlled* accurately. As the tape thickness becomes small, the running tension and touch pressure of the head have to be decreased, and therefore the head-tape contact and running properties become less uniform and less stable if the surface of the support is not controlled as described herein, possibly resulting in head-track misalignment and loss of signals. An increased demand for increased data transfer rate has led to an increased relative velocity between head and tape, which increases the generation of frictional heat. To control it below a proper limit, *the* film of the present invention is very useful because the height and number of protrusions are [control led] *controlled* within a specific range. Thus, film of the present invention can provide magnetic tape products that effectively meet the requirement for higher capacity. The thickness of the support should preferably be 5.5 μm or less, more preferably 4.5 μm or less, and the recording density of the resultant magnetic recording medium should preferably be 25 KB/mm$^2$ or more, more preferably 34 KB/mm$^2$ or more.

Magnetic recording [medium] *media* of the present invention can be very useful for tape products for home use, professional use, broadcast use such as D-1, D-2, and D-3, digital video cassette, DDS-2, 3, and 4, data 8 mm tape, QIC, and other data storage uses. [Most] *The most* preferred use is data storage in which greatest importance is placed on stability requirements related to loss of data, etc.

Many methods are available for producing the magnetic layer including coating methods in which magnetic powder such as iron oxide or powdered metal are kneaded with a thermosetting, thermoplastic, or radiation curable binder, followed by coating and drying, and *by* dry methods where thin magnetic metal layer is produced over the base film directly from Ni, Co, Cr, Fe, $\gamma$-$Fe_2O_3$, or other metals, or their alloys by[.] such a process as vapor deposition, sputtering, or ion plating. The use of a dry method is preferred because the resultant film can have very good surface properties characteristic of the present invention. When a dry method is adopted, the resultant magnetic recording medium is further provided with a protective layer such as diamond-like coating, which may be further coated with a lubricant, in order to enhance the durability and slip properties.

For magnetizing, either horizontal or perpendicular magnetizing methods can be used, and furthermore, the present invention can also be applied effectively to optical recording tape.

Some production methods that can be used for the invention are described below, but this is not by way of limitation[s]. When aromatic polyamide is to be produced from an acid chloride and a diamine, solution polymerization may be performed in an [aprotonic] *aprotic* organic polar solvent such as N-methyl pyrrolidone (NMP), dimethylacetamide (DMAc), or dimethylformamide ([DUF] *DMF*), or interfacial polymerization may be performed in an aqueous medium. In such cases, care should be taken so that water or other substances that inhibit the reaction will not *be* allowed to come into the reaction system, in order to prevent the formation of low molecular weight components, and therefore, an effective stirring method should be used. The [material s] *material's* composition in terms of [equivalent] *equivalents* is important, but it should be adjusted properly in some cases to avoid deterioration of [the] film forming performance. Solubilizers such as calcium chloride, magnesium chloride, lithium chloride, lithium bromide, lithium nitrate may also be added.

Hydrogen chloride is produced as a byproduct if aromatic diacid chloride and aromatic diamine are used as monomers. Its neutralization may be performed with an inorganic neutralizer such as a salt consisting of a cation of a substance belonging to the first or second group of the periodic system such as calcium hydroxide, calcium carbonate, or lithium carbonate, and such an anion as hydroxide ion or carbonate ion, or an organic neutralizer such as ethylene oxide, propylene oxide, ammonia, triethylamine, triethanol amine, or diethanolamine. To improve the humidity-related properties of the base film, such substances as benzoyl chloride, phthalic anhydride, acetic chloride, and aniline may be added to the system after the completion of the polymerization in order to cap the polymer ends. The reaction of isocyanate and carboxylic acid should be performed in [a] *an* aprotic organic polar solvent [under] *in* the [existence] *presence* of a proper catalyst.

Such a polymer solution as obtained may be blended with a dissimilar polymer, or the polymer may be separated and then dissolved in an organic solvent as listed above or in an inorganic solvent such as sulfuric acid to provide *a* stock solution to be used for the blending.

Organic or inorganic particles may *be* added during the above process.

To obtain *an* aromatic polyamide of the present invention, the intrinsic viscosity of the polymer (measured at 30° C. for a 100 ml sulfuric acid solution containing 0.5 g of the polymer) should preferably be 0.5 or more.

As a solubilizer, an inorganic salt such as calcium chloride, magnesium chloride, lithium chloride, or lithium nitrate may be added to the stock solution. It is preferred that the content of the polymer in the stock solution for film production is in the range of about 2 to 40 wt %.

The dissimilar polymers, which may be in the form of pellets or powder, may be added directly to the solution before or after the polymerization of aromatic polyamide, or they may be dissolved in separate solvents, which may be different from each other or the same, followed by their addition and blending.

The stock solution as prepared above is filtered through a filter with a filtration accuracy of 6,000 nm or less, and then subjected to film production by a solution casting process. Solution methods include dry-wet, dry, and wet ones, but the use of a dry-wet or a dry method is preferred because surface protrusion formation by phase separation can be [control led] *controlled* easily in producing aromatic polyamide film of the present invention. If a dry-wet method is used for film production, the stock solution is extruded through a die onto support such as drum or endless belt to form thin film, followed by drying so that solvents are removed from the film until the film [acquires] *is* self sustained [property]. The drying conditions are one of the most important points in producing aromatic polyamide film of the present invention, and may have large influence on the surface properties of the resultant film. If the temperature of the support at the time of the casting of the stock solution, Tb (° C.), and the temperature of the hot air introduced onto the cast film, Ta (° C.), are in the range that meet the following formula, dissimilar polymers will be deposited all over the surface as a result of a convection current that is generated as the solvent evaporates, making it possible to effectively produce aromatic polyamide film with uniform, fine surface protrusions as proposed by the present invention.

$$20 \leqq Ta - Tb$$

If Ta−Tb is less than 20° C., the temperature difference is not sufficiently large to generate a required convection current to produce sufficient protrusions. The difference should more preferably be 40° C. or more, further more preferably 50° C. or more. The upper limit of Ta−Tb is about 100° C. as long as excessive drying stain is produced. If an endless belt is used as support, a required temperature difference can be produced effectively during the polymer casting by adjusting the heating temperature above and below the endless belt or by cooling the film after the peeling of film. It is further preferred that the solvent is evaporated from the cast film which is then dried at a desolvating rate of 3–20%/min, more preferably 5–15%/min. If the desolvating rate is less than 3%/min, *the* protrusions may become so flat that they cannot meet the requirements of the present invention. If the desolvating rate is more than 20%/min, the number of large protrusions may become large [to] *and* increase the surface roughness, failing to meet the requirements of the present invention. Depending on the type of aromatic polyamide and/or dissimilar polymers, the casting temperature at the die may be [control led] *controlled* within the range of 40° C. to 150° C. so that the aromatic polyamide polymer, which tend to suffer phase separation when in the form of a solution, is kept miscible in the solution whereas phase separation is caused at the time of molding, making it possible to produce film with surface protrusion as proposed in the present invention. The surface properties of the belt contact surface can be [control led] *controlled* by controlling the number of surface defects on the drum or endless belt used for the drying process. The number of surface defects with a diameter of 30 μm or more should preferably be 0.001 to $0.02/mm^2$, more preferably 0.002 to [0.015/mm] $0.015/mm^2$.

Film thus aquiring self sustaining property is then subjected to a wet process. Baths used for a wet process generally consist of an aqueous medium. The bath used may contain organic or inorganic solvents, inorganic salts, etc., in addition to water. The bath a temperature is usually in the range of 0 to 100° C., and salts and solvents contained in the film is extracted as it passes though the bath. When being fed to the bath for the wet process, the film has not achieved a sufficient surface hardness, so if the bath medium contains contaminants, they will remain on the film surface to reduce its surface properties. The medium to be used for the bath for the dry process, therefore, should be used after being filtered through a filter with a filtration accuracy of 6,000 nm or less, preferably 5,000 nm or less, more preferably 3,000 nm or less. The time required for the film to pass though the entire bath for the wet process is 10 sec to 30 min, depending on the thickness of the film. The film. The film may be extended in the machine direction as required.

The film is then led to a tenter for drying and/or heat treatment. The conditions for the drying and/or heat treatment are one of the most important points in producing aromatic polyamide film of the present invention. The drying and/or heat treatment is generally carried out by blowing hot air through a slit or circular nozzle against the film surface. To achieve surface properties of the present invention, it is preferred that the maximum temperature during this process is not less than the glass transition temperature of the dissimilar polymer (hereinafter denoted by Tg ° C.) and not more than Tg+100° C., because, if the maximum temperature is within this range, the dissimilar polymer tends to become spherical or elliptical due to its Brownian motion to meet the requirements of [t] the present invention. The speed of the hot air at the film surface [s h] should preferably be 1 to 30 m/sec, more preferably 2 to 20 m/sec, further more preferably 2 to 10 m/sec, to effectively produce film of the present invention. If the air speed is less than 1 m/sec, heat transfer in the film will not occur uniformly, heavily increasing the surface roughness in some cases. If the air speed is more than 30 m/sec, crater-like irregularities may be produced, heavily increasing the surface roughness in some cases. As long as it is performed in a tenter, the drying and/or heat treatment at not more than the above-mentioned maximum temperature may be carried out at any point in the entire process. Heat treatment at the maximum temperature, for instance, may be performed after drying, or treatment at the maximum temperature may be followed by heat treatment at a lower temperature.

Film as produced as described above is stretched during the film production process so that the mechanical and thermal properties will meet the requirements of the present invention. The stretching ratio should preferably be 0.8 to 8.0, more preferably 1.1 to 5.0, in area (which is defined as the area of the film after stretching divided by that before stretching the ratio of 1 [II] indicating relaxation). After this entire process, the resultant material is taken up by a winder to obtain aromatic polyamide film.

Slow cooling after the extension or heat treatment is effective. In particular, slow cooling at a rate of 50° C./sec or less [a] is effective.

Mono-layer film of the present invention can have good surface properties, but such film may consists of more than one layers. To produce multi layered film, two-layer film for instance, polymerized aromatic polyamide solution is divided into two parts, and aromatic polysulfone is added to at least one of them, followed by combining them together. The same process applies to the production of film consisting of three or more layers. Known methods to produce such a structure include the building up of layers in a die or in a feed block, and production of one layer followed by laminating it with another layer.

Measuring methods and criteria for various characteristic values relating to the invention are described below.

(1) Root-Mean-Square Roughness (Rq), 10-Point Average Roughness (Rz), Average Roughness (Ra), Maximum Protrusion Roughness (Rt), Number of Protrusions, Average Protrusion Diameter, Average Protrusion Height/Average Protrusion Diameter (HD), and Cross-Section Area of Protrusion:

Ten measurements are made at different points by atomic force microscopy (AFM) under the following conditions.

Equipment: NanoScope III AFM (manufactured by Digital Instruments)

Cantilever: silicon single crystal

Scanning more: tapping mode

Scanned area: 5 μm×5 μm

Scanning rate: 0.5 Hz

Measuring environment: temperature 25° C., relative humidity 55%

For Rq, Rz, Ra, Rt, and number of protrusions, the average of the above-mentioned measurements is used.

For HD, the areal average diameter, D, is calculated from the cross-section of a protrusion formed by the horizontal plane at a height of 0 nm, which is measured above, and it is used here as the value of average protrusion diameter. The height of the protrusion, H, divided by D is defined as HDi of that protrusion. This measurement is made for 100 or more protrusions that have been selected arbitrarily, and their average is defined as HD.

To determine the proportion of the cross-section of protrusions formed by a horizontal plane at a specific height to the total surface area, the cross-section of a protrusion formed by a horizontal plane that is at a specific height from the surface plane (0 nm) and is parallel to the surface plane is measured by the above-mentioned AFM equipment, and the cross-section is divided by the measured area and multiplied by 100.

In another approach, shadowed (5°) images are observed by scanning electron microscopy at a magnification of 30,000 or more, and protrusions of 5 nm or more in height as estimated from the length of their shadow is counted to determine the number of protrusions. The HD value may also be determined by calculating (major axis+major axis)/2 of each protrusion and (protrusion height/average diameter) for 100 or more protrusions, followed by averaging them.

(2) Non-Particle Index

The field emission-type scanning electron microscopy and energy dispersive X-ray analysis system described below (FE-SEM-XMA) is used to make analysis for not less than 100 protrusions selected arbitrarily and count the number of protrusions in which a particle-originating component is detected, followed by calculation of the non-particle index by the following formula:

Non-particle index (X)=100 ×(number of protrusions in which a particle-originating component is detected in the above measurement)/(measured number of protrusions)

Equipment: field emission-type scanning electron microscope S-800, manufactured by Hitachi, Ltd.

energy dispersive X-ray analyzer EMAX-3770, manufactured by Horiba, Ltd.

Measuring conditions

[accelerating] *Accelerating* voltage: 15 kV

[irradiation] *Irradiation* current: 0.2 nA

Measuring time: 100 sec

Preparation of specimen: carbon deposition onto specimen (3) Tensile Young's modulus and Elongation A specimen 10 mm wide and 150 mm long, cut out of film, is extended in an Instron type tensile testing machine under the conditions of a chuck-to-chuck distance of 100 mm, stretching rate of 300 mm/min, chart speed of 500 mm/min, temperature of 23° C., and relative humidity of 65%. The tensile Young's modulus is determined from the tangent line to the rising part of the [weight-elongation] *load-elongation* curve obtained above. The elongation is determined from the length at break of the specimen minus the chuck-to-chuck distance, divided by the chuck-to-chuck distance and multiplied by 100.

(4) Resistance to Scraping

A tape-like specimen (8 mm wide), cut out from film, is allowed to travel on guide pins of polyoxymethylene in a tape travel testing machine (TBT300D/H manufactured by Yokohama System Laboratory, Inc.) under the conditions of a travelling speed of 200 m/min, back-and-forth travelling 10 times, winding angle of 180°, and travelling tensile stress of 1 kg/mm$^2$. After the completion of travelling, the damage to the pins is observed and a decision is made according to the following criteria.

⊚: no damage observed

○: slight damage in a few parts

Δ: slight damage in all parts

X: heavy damage in all parts

5) Film Dust/Particle Removal

A tape-like specimen (8 mm wide), [cutout] *cut out* from film, is allowed to travel on guide pins of stainless steel in a tape travel testing machine (TBT300D/H manufactured by Yokohama System Laboratory, [inc.] *Inc.*) under the conditions of a travelling speed of 200 m/min, back-and-forth travelling 10 times, winding angle of 180°, and travelling tensile stress of 1 kg/mm$^2$. After the completion of travelling, a decision is made on the basis of the degree of film dust or particles found on the pins.

⊚: no dust or particles observed

○: small amounts in a few parts

Δ: small amounts in all parts

X: large amounts in all parts (6) Resistance to Scratch

Continuous loading type scratch hardness testing machine HEIDON-18, manufactured by Shinto Chemical Co., is used to perform scratch hardness testing, and non-contact roughness analyzer TOPO-3D, manufactured by Wyco, [inc.] *Inc.*, is used to determine the depth of flaws.

Measuring Conditions scratching needle: tip curvature radius of 100 μm (made of sapphire)

[weight: 0.100 g/100 mm] *load: 0-100 g/100 mm* travelling speed: 10 m/min

Criteria

○: flaw depth less than 0.5 μm

Δ: flaw depth 0.5 μm or more and less than 1.5 μm

X: flaw depth more than 1.5 μm (7) Desolving Rate

Gel film is peeled off from the belt after drying for t minutes in a dry process. A specimen is cut off and its weight ($W_1$) is measured. After washing in a water bath for 10 minutes, the film specimen is heat-treated at 280° C., and its weight is measured ($W_2$), from which the polymer content ($P_1$) in the gel film is calculated by the formula shown below. The desolvating rate is calculated by another formula given below from $P_1$ and the initial content ($P_0$) in the stock solution for film production.

$$P_1=(W_2/W_1)\times 100$$

$$\text{Desolvating ratio}=(P_1-P_0)/t$$

(8) Electromagnetic Conversion Properties a) Initial Output Properties

Vacuum deposition is performed to form a magnetic layer on the surface of the film that is not in contact with the metal belt during the film [product ion] *production* process. A specimen 6.35 mm wide and 150 m long is cut off from the film, and set in a cassette. A sine wave is recorded with the optimum recording current, and the reproduction output from the film minus that from the reference tape is determined.

b) Dropout

The above tape cassette is placed on a video player, and signals of 4.4 MHz are recorded. The tape is then reproduced and the dropout at 15 μsec-20dB is measured for 20 minutes with a dropout [USA] counter manufactured by Okura Industries, Ltd., followed by calculation of the dropout per minute.

(9) Durability

In an environment of 25° C. and 55 %RH, the tape produced in paragraph [4-a] *4a* is allowed to run 100 times at 1,000 m/min on a 6 mm diameter guide pin with an angle, θ, of π/2 (rad) and tape-feed tension, T1, of 200 g, followed by measurement of the output and evaluation according to the following criteria.

○:difference from initial output less than 1 dB

Δ: difference from initial output 1 dB or more and less than 3 dB

X: difference from initial output more than 3 dB

Examples are given below, not by way of limitations, to further illustrate the present invention.

EXAMPLE 1

In N-methyl-2-pyrrolidone (hereinafter denoted by NMP), [2-chloroparaphenylendiamin] *2-chloroparaphenylendiamine*, as *an* aromatic diamine component, and 4,4'-diamino diphenyl ether were dissolved up to a content equivalent to 80 mol % and 20 mol %, respectively, and 2-chloroterephthaloyl chloride was then added up to a content equivalent to 100 mol %, followed by stirring for 2 hours to complete the polymerization. The solution was neutralized with lithium hydroxide to provide an aromatic polyamide solution with a polymer content of 10wt % and viscosity of 3,000 poise (hereinafter referred to as solution A).

A 10 wt % amount of polyethersulfone (PES-E2010, hereinafter referred to as PES, manufactured by Mitsui Toatsu Chemicals, Inc.) was dissolved in NMP, and blended with solution A to provide a mixed solution in which PES accounted for 3 wt % of the total amount of aromatic polyamide and PES, followed by adequate mixing at 50° C. for 3 hours.

The mixed solution thus obtained was filtered through filters with filtering accuracy of 5,000 nm and 1,000 nm, and, while being kept at a temperature of 60° C., cast onto an endless belt that had surface defects of 30 μm or more in diameter at a rate of 0.005/mm$^2$. At the time of casting, the temperature of the support, Tb, and the temperature of hot air, Ta, were 140° C. and 170° C., respectively. The desolvating rate was 10.2%/min. After being peeled off from the belt, the film was then immersed in a water bath at 140° C. for 5 minutes, dried at 160° C. for 30 seconds, and heat-treated in 280° C. hot air of a flow speed of 5 m/sec to produce aromatic polyamide film of 4.3 μm in thickness. During the film production process, the film was stretched up to the ratio, 1.2 and 1.3 in the machine direction and the transverse direction, respectively.

The film had a Rq of 2.9 nm, Rz of 23.2 nm, Ra of 1.9 nm, Rt of 28.0 nm, non-particle index of 100%, HD of 0.07, and number of not less than 5 nm protrusions of 14,000,000/$mm^2$. Its tensile Young's modulus and elongation in the machine direction and the transverse direction, were 13.1 GPa and 13.2 GPa, respectively, and 45% and 46 %, respectively. Its resistance to scraping, film dust/particle removal, and resistance to scratch were evaluated as ◎, ◎, and ○. respectively. Production conditions and film properties are shown in Tables 1 to 5.

EXAMPLE 2

Polyetherimide ("Ultem-1000", hereinafter PEI, manufactured by Japan GE Plastics) is dissolved in NMP up to 10 wt %, and blended with solution A prepared in Example 1 to provide a mixed solution in which PEI accounted for 1.5 wt % of the total. amount of aromatic polyamide and PEI, followed by adequate mixing at [70° C] *70° C.* for 3 hours.

The mixed solution thus obtained was filtered through filters with filtering accuracy of 5,000 nm and 1,000 nm, and, while being kept at a temperature of 120° C., cast onto an endless belt that had surface defects of 30μm or more in diameter at a rate of 0.005/$mm^2$. At the time of casting, the temperature of the support, Tb, and the temperature of hot air, Ta, were 140° C. and 170° C., respectively. The desolvating rate was 10.2%/min. After being peeled off from the belt, the film was then immersed in a water bath at 40° C. for 5 minutes, dried at 160° C. for 30 seconds, and heat-treated in 280° C. hot air of a flow speed of 5 m/sec to produce aromatic polyamide film of 4.3 μm in thickness. During the film production process, the film was stretched up to the ratio, 1.2 and 1.3 in the machine direction and the transverse direction, respectively.

Production conditions and film properties are shown in Tables 1 to 5.

EXAMPLE 3

Polycarbonate ("Taflon", hereinafter PC, manufactured by Idemitsu Petrochemical Co., Ltd.) is dissolved in NMP up to 10 wt %, and blended with solution. A prepared in Example 1 to provide a mixed solution in which PC accounted for 2.0 wt % of the total amount of aromatic polyamide and PC, followed by adequate mixing at 50° C. for 3 hours.

The mixed solution thus obtained was filtered through filters with filtering accuracy of 5,000 nm and 1,000 nm, and, while being kept at a temperature of 50° C., cast onto an endless belt that had [2] surface defects of 30 μm or more in diameter at a rate of 0.005/$mm^2$. At the time of casting, the temperature of the support, Tb, and the temperature of hot air, Ta, were 110° C. and 140° C., respectively. The desolvating rate was 7.2%/min. After being peeled off from the belt, the film was the immersed in a water bath at 40° C. for 5 minutes, dried at 160° C. for 30 seconds, and heat-treated in 280° C. hot air of a flow speed of 5 m/sec to produce aromatic polyamide film of 4.3 μm in thickness. During the film production process, the film was stretched up to the ratio, 1.2 and 1.3 in the machine direction and the transverse direction, respectively.

Production conditions and film properties are shown in Tables 1 to 5.

EXAMPLE 4

Polycarbonate ("U-100", hereinafter PAR, manufactured by Untika Ltd.) is dissolved in [NUP] *NMP* up to 10 wt %, and blended with solution A prepared in Example 1 to provide a mixed solution in which PAR accounted for 8.0 wt % of the total amount of aromatic polyamide and PAR, followed by adequate mixing at 50° C. for 3 hours.

The mixed solution thus obtained was filtered through filters with filtering accuracy of 5,000 nm and 1,000 nm, and, while being kept at a temperature of 50° C., cast onto an endless belt that had [2] surface defects of 30 μm or more in diameter at a rate of [0.005/mm] *0.005/$mm^2$*. At the time of casting, the temperature of the support, Tb, and the temperature of hot air, Ta, were 140° C. and 170° C., respectively. The desolvating rate was 10.3%/min. After being off from the belt, the film was then immersed in a water bath at 40° C. for 5 minutes, dried at 160° C. for 30 seconds, and heat-treated in 280° C. hot air of a flow speed of 5 m/sec to produce aromatic polyamide film of 4.3 μm in thickness. During the film production process, the film was stretched up to the ratio, 1.2 and 1.3 in the machine direction and the transverse direction, respectively.

Production conditions and film properties are shown in Tables 1 to 5.

EXAMPLE 5

Paraphenylendiamine and terephthaloyl chloride were subjected to a known polymerization method, washed, and dried to produce polyparaphenylene terephthalamide (hereinafter referred as PPTA) with a [n inh] η *inh* of 5.5 (intrinsic viscosity measured in concentrated sulfuric acid solution with a polymer content of [0.5 g/10 m] *0.5 g/10 ml*), which was dissolved in 99.5% concentrated sulfuric acid up to a polymer content of 12 wt %.

Elsewhere, 100 mol % of diamino diphenyl either and 93 mol % of pyromellitic anhydride were subjected to polymerization for 2 hours while being kept at not more than 50° C. After the completion of polymerization, large amounts of water was used to ensure reprecipitation, followed by repeated washing in water and acetone and vacuum drying at 50° C. to provide polyamic acid which is a precursor of polyamide (hereinafter referred to as PI).

Powder of this polyamic acid was added to the PPTA solution prepared earlier so that the weight fraction of [Pi] *PI* becomes 4%, followed by stirring at 50° C. for 3 hours to ensure complete dissolution.

The stock solution for film production thus obtained, while being kept at 60° C., was cast onto an tantalum endless belt with a Tb of 60° C., and moistened air of temperature of 90° C. and relative humidity of 70% was blown against it (Ta=90° C.). The cast polymer film, together with the belt, was put in a 40% sulfuric acid solution of 0° C. to ensure coagulation. After being peeled off from the belt, the film was washed in a water bath of 10° C., neutralized in a 1% sodium hydroxide bath, washed in a hot water bath of 50° C., set to a tenter, dried at 160° C. for 30 seconds, and heat-treated in hot air of temperature of 350° C. and flow rate of 5 m/sec to produce aromatic polyamide film of 4.3 μm in thickness. During the film production process, the film was stretched up to the ratio, 1.1 and 1.25 in the machine direction and the transverse direction, respectively.

Production conditions and film properties are shown in Tables 1 to 5.

EXAMPLE 6

Colloidal silica with a primary particle diameter of 20 nm was dispersed adequately in NMP and added to aromatic polyamide up to 0.1 wt %, followed by polymerization by the same procedure as in Example 1. The resultant solution was blended with a PES solution as in Example 1 to produce a stock solution for film production, from which film was produced by the same procedure as in Example 1. Production conditions and film properties are shown in Tables 1 to 5.

Comparative Example 1

Only solution A prepared in Example 1 was subjected to the same film production process as in Example 1 to produce film.

Production conditions and film properties are shown in Tables 1 to 5.

Comparative Example 2

Except that blending with solution A was performed up to a PEI content of 12 wt %, the same procedure as in Example 2 was carried out to produce film. Production conditions and film properties are shown in Tables 1 to 5.

Comparative Example 3

Except that blending with solution A was performed up to a PES content of 0.3 wt % and that drying was performed at both Ta and Tb of 170° C., the same procedure as in Example 1 was carried out to procedure film.

Production conditions and film properties are shown in Tables 1 to 5.

Comparative Example 4

Colloidal silica with a primary particle diameter of 30 nm was dispersed in NMP using ultrasonic wave, and added to solution A prepared in Example 1 up to 2 wt % relative to aromatic polyamide, followed by stirring at 60° C. for 3 hours. The resultant solution, without adding a dissimilar polymer, was used as stock solution to produce film by the same procedure as in Example 1.

[Product ion] *Production* conditions and film properties are shown in Tables 1 to 5.

TABLE 1

| | Dissimilar polymer or particle | Content (wt %) | δa $(MJ/m^3)^{1/2}$ | δb $(MJ/m^3)^{1/2}$ | δa-δb\| $(MJ/m^3)^{1/2}$ | Polymer temp. at **[**discharge**]** *casting* (° C.) | Hot air temp. Ta (° C.) | Support temp. **[**tb**]***Tb* (° C.) |
|---|---|---|---|---|---|---|---|---|
| Example 1 | PES | 3 | 56.6 | 53.6 | 3.0 | 60 | 170 | 140 |
| Example 2 | PEI | 1.5 | 56.6 | 55.7 | 0.9 | 120 | 170 | 140 |
| Example 3 | PC | 2 | 56.6 | 49.2 | 7.4 | 50 | 140 | 110 |
| Example 4 | PAR | 8 | 56.6 | 51.1 | 5.5 | 50 | 140 | 110 |
| Example 5 | PI (polyamic acid) | 4 | 59.9 | 58.9 | 1.0 | 60 | 90 (70 RH %) | 60 |
| Example 6 | PES<br>colloidal silica | 3<br>0.1 | 56.6 | 53.6 | 3.0 | 60 | 170 | 140 |
| Comparative example 1 | none | none | 56.6 | — | — | 60 | 170 | 140 |
| Comparative example 2 | PEI | 12 | 56.6 | 55.7 | 0.9 | 120 | 170 | 140 |
| Comparative example 3 | **[**PFS**]***PES* | 0.3 | 56.6 | 53.6 | 3.0 | 60 | 170 | 170 |
| Comparative example 4 | colloidal silica | 2 | 56.6 | — | — | 60 | 170 | 140 |

TABLE 2

| | Desolvating rate (%/min) | Drying temp. (° C.) | Heat treatment temp. (° C.) | Heat treatment air speed (m/sec) | Stretching ratio in machine direction | Stretching ratio in transverse direction |
|---|---|---|---|---|---|---|
| Example 1 | 10.2 | 160 | 280 | 5 | 1.2 | 1.3 |
| Example 2 | 10.2 | 160 | 280 | 5 | 1.2 | 1.3 |
| Example 3 | 7.2 | 160 | 280 | 5 | 1.2 | 1.3 |
| Example 4 | 10.3 | 160 | 280 | 5 | 1.2 | 1.3 |
| Example 5 | 3.2 | 160 | 350 | 5 | 1.1 | 1.25 |
| Example 6 | 9.9 | 160 | 280 | 5 | 1.2 | 1.3 |
| Comparative example 1 | 10.1 | 160 | 280 | 5 | 1.2 | 1.3 |
| Comparative example 2 | 10.3 | 160 | 280 | 5 | 1.2 | 1.3 |
| Comparative example 3 | 20.5 | 160 | 280 | 5 | 1.2 | 1.3 |
| Comparative example 4 | 10.5 | 160 | 280 | 5 | 1.2 | 1.3 |

[45]5

TABLE 3

| | Rq (nm) | Rz (nm) | Ra (nm) | Rt (nm) | Rt/Ra | Non-particle index (%) | HD [(nm)] | Average protrusion diameter (nm) |
|---|---|---|---|---|---|---|---|---|
| Example 1 | 2.9 | 23.2 | 1.9 | 28.0 | 14.7 | 100 | 0.07 | 190 |
| Example 2 | 4.8 | 57.2 | 3.7 | 66.2 | 17.9 | 100 | 0.13 | 420 |
| Example 3 | 1.5 | 12.0 | 0.9 | 13.5 | 15.0 | 100 | 0.06 | 60 |
| Example 4 | 2.8 | 30.2 | 2.2 | 44.0 | 20.0 | 100 | 0.15 | 350 |
| Example 5 | 3.1 | 28.4 | 2.3 | 32.4 | 14.1 | 100 | 0.10 | 210 |
| Example 6 | 3.7 | 33.5 | 2.3 | 40.7 | 17.7 | 99 | 0.12 | 180 |
| Comparative example 1 | 0.9 | 11.3 | 0.8 | 17.5 | 21.8 | 100 | 0.02 | 20 |
| Comparative example 2 | 12.5 | 120 | 10.8 | 250 | 23.1 | 100 | 0.16 | 560 |
| Comparative example 3 | 0.9 | 10.5 | 0.7 | 13.5 | 19.3 | 100 | 0.06 | 30 |
| Comparative example 4 | 8.4 | 88.0 | 6.7 | 105 | 15.7 | 3 | 0.66 | 40 |

TABLE 4

| | No. of protrusions (×10,000/mm$^2$) | | | | Cross-section (%) | | | Particle protrusions | | Young's modulus (GPa) | Elongation (%) |
|---|---|---|---|---|---|---|---|---|---|---|---|
| | 5 nm≦ | 10 nm≦ | 15 nm≦ | 50 nm≦ | 5 nm | 10 nm | 15 nm | Number (×10,000/mm$^2$) | Height (nm) | MD/TD | MD/TD |
| Example 1 | 1400 | 250 | 70 | 0 | 7.8 | 2.3 | 0.03 | — | — | 13.1/13.2 | 45/46 |
| Example 2 | 580 | 80 | 40 | 20 | 15.5 | 6.2 | 1.3 | — | — | 13.5/13.3 | 36/35 |
| Example 3 | 250 | 4 | 0 | 0 | 0.9 | 0 | 0 | — | — | 12.0/11.7 | 52/36 |
| Example 4 | 130 | 100 | 60 | 40 | 4.3 | 1.6 | 0.9 | — | — | 11.0/10.8 | 46/39 |
| Example 5 | 720 | 280 | 160 | 0 | 7.3 | 1.8 | 0.04 | — | — | 14.2/13.5 | 28/29 |
| Example 6 | 1450 | 300 | 100 | 2 | 8.0 | 2.4 | 0.3 | 10.0 | 42 | 13.1/13.1 | 42/44 |
| Comparative example 1 | 18 | 0 | 0 | 0 | 0.02 | 0 | 0 | — | — | 13.2/13.1 | 46/48 |
| Comparative example 2 | 275 | 120 | 100 | 80 | 22.0 | 11.3 | 6 | — | — | 9.5/9.6 | 27/25 |
| Comparative example 3 | 65 | 8 | 0 | 0 | 0.4 | 0 | 0 | — | — | 13.3/13.2 | 46/45 |
| Comparative example 4 | 780 | 420 | 210 | 80 | 2.2 | 1.0 | 0.7 | 750 | 38 | 13.0/13.0 | 45/40 |

MD: machine direction
TD: transverse direction

TABLE 5

| | Resistance to scraping | Film dust/ particle removal | Resistance to scratch | Output (dB) | Dropout [number/min)] *(number/min)* | Durability |
|---|---|---|---|---|---|---|
| Example 1 | ◎ | ◎ | ○ | 2.3 | 0.3 | ○ |
| Example 2 | ○ | ○ | ○ | −0.3 | 1.1 | Δ |
| Example 3 | ◎ | ○ | Δ | 2.0 | 1.5 | Δ |
| Example 4 | ○ | ○ | Δ | 1.9 | 0.8 | Δ |
| Example 5 | ◎ | ◎ | ○ | 2.0 | 0.5 | ○ |
| Example 6 | ◎ | ◎ | ○ | 1.5 | 1.1 | ○ |
| Comparative example 1 | ◎ | X | X | 2.7 | 0.3 | X |
| Comparative example 2 | X | X | Δ | −2.3 | 3.2 | Δ |
| Comparative example 3 | Δ | X | X | 1.4 | 0.3 | X |
| Comparative example 4 | X | X | Δ | −1.3 | 3.7 | X |

EXAMPLE 7

In dehydrated NMP, CPA and DPE were dissolved up to a content equivalent to 90 mol % and 10 mol %, respectively, and CTPC was then added up to a content equivalent to 98.5 mol % followed by stirring for 2 hours to complete the polymerization. The solution was neutralized with lithium carbonate to provide an aromatic polyamide solution with a polymer content of 10.5 wt % (hereinafter referred to as solution A).

Elsewhere, a 15 wt % amount of dried *polyethersulfone* PES-E2010 (hereinafter referred to as PES), manufactured by Mitsui Toatsu Chemicals, Inc., was dissolved in NMP,

[ancl] *and* this PES solution was added to solution A to provide a mixed solution in which PES accounted for 3 wt % relative to aromatic polyamide. This solution is hereinafter referred to as solution B.

Solution B thus obtained was filtered through a 5 μm-cut filter, cast onto a stainless steel endless belt with a mirror finished surface, and heated at 150° C. for 5 minutes to evaporate the solvent until the film acquired [self-sustain] *self-sustaining* property. The film was then peeled off from the belt continuously. At this point, the polymer content in the get film was 39.8 wt %, and the desolvating rate was 5.9%/min. The film was then immersed in a water bath for 2 minutes for aqueous extraction of the remaining solvent and inorganic salts that had resulted from neutralization. During this process, the film was stretched up to the ratio of 1.2 in the machine direction. Subsequently, while being dried and heat-treated in 280° C. hot air of a flow speed of 3 m/sec, the film was stretched up to the ratio of 1.3 in the transverse direction. The film was further heat-treated at 250° C. for 1.5 minutes, followed by slow cooling at 20° C./sec to produce aromatic polyamide film of 4.2 μm in thickness.

EXAMPLE 8

Spherical silica with an average particle diameter of 20 nm was added to polymer solution B prepared in Example [1] 7 up to 0.2 wt % relative to polyamide, followed by film production by the same procedure as in Example 7.

Production conditions and film properties are shown in Tables 6 to 10.

EXAMPLE 9

PES was added to polymer solution A prepared in Example 7 up to 4 wt % relative to aromatic polyamide by the same procedure as in Example 6, followed by film production by the same procedure as in Example 7.

Production conditions and film properties are shown in Tables 6 to 10.

EXAMPLE 10

Using polymer solution B prepared in Example 7, film was produced by the same procedure as in Example 7 except that drying was performed at 220° C. for 1.5 minutes.

Production conditions and film properties are shown in Tables 6 to 10.

Comparative Example 5

PES was added to polymer solution A prepared in Example 6 up to 0.05 wt % relative to aromatic polyamide by the same procedure as in Example 7, followed by film production by the same procedure as in Example 7.

Production conditions and film properties are shown in Tables 6 to 10.

Comparative Example 6

PES was added to polymer solution A prepared in Example 7 up to 20 wt % relative to aromatic polyamide by the same procedure as in Example 7, followed by film production by the same procedure as in Example 7 except that drying was performed at 150° C. for 6 minutes.

Production conditions and film properties are shown in Tables 6 to 10.

TABLE 6

| | Dissimilar polymer or particle | Content (wt %) | Hot air temp. Ta (° C.) | Support temp. Tb (° C.) | Desolvating rate (%/min) |
|---|---|---|---|---|---|
| Example 7 | PES | 3 | 150 | 95 | 5.9 |
| Example 8 | PES | 3 | 150 | 95 | 6.1 |
| | colloidal silica | 0.2 | | | |
| Example 9 | PES | 4 | 150 | 95 | 5.8 |
| Example 10 | PES | 3 | 220 | 95 | 17.0 |
| Comparative example 5 | PES | 0.05 | 150 | 95 | 5.7 |
| Comparative example 6 | PES | 20 | 150 | 95 | 5.5 |

TABLE 7

| | Heat treatment temp. (° C.) | Heat treatment air speed (m/sec) | Re-heat treatment temp. (° C.) | Stretching ratio in machine direction | Stretching ratio in transverse direction |
|---|---|---|---|---|---|
| Example 7 | 280 | 3 | 250 | 1.2 | 1.3 |
| Example 8 | 280 | 3 | 250 | 1.2 | 1.3 |
| Example 9 | 280 | 3 | 250 | 1.2 | 1.3 |
| Example 10 | 280 | 3 | 250 | 1.2 | 1.3 |
| Comparative example 5 | 280 | 3 | 250 | 1.2 | 1.3 |
| Comparative example 6 | 280 | 3 | 250 | 1.2 | 1.3 |

TABLE 8

| | Rq (nm) | Rz (nm) | Ra (nm) | Rt (nm) | Rt/Ra | Non-particle index (%) | HD [(nm)] | Average protrusion diameter (nm) |
|---|---|---|---|---|---|---|---|---|
| Example 7 | 2.5 | 21.3 | 1.8 | 26.3 | 14.6 | 100 | 0.06 | 220 |
| Example 8 | 2.7 | 27.5 | 1.9 | 30.4 | 16.0 | 99 | 0.06 | 210 |
| Example 9 | 3.3 | 29.2 | 2.5 | 32.3 | 12.9 | 100 | 0.05 | 280 |
| Example 10 | 4.1 | 33.6 | 3.2 | 44.0 | 13.8 | 100 | 0.11 | 330 |
| Comparative example 5 | 0.9 | 11.0 | 0.8 | 16.3 | 20.4 | 100 | 0.03 | 30 |
| Comparative example 6 | 8.4 | 81.5 | 8.1 | 97.0 | 12.0 | 100 | 0.10 | 380 |

TABLE 9

| | No. of protrusions (×10,000/mm²) | | | | Cross-section (%) | | | Particle protrusions | | Young's |
|---|---|---|---|---|---|---|---|---|---|---|
| | | | | | | | | Number | Height | modulus |
| | 5 nm≦ | 10 nm≦ | 15 nm≦ | 50 nm≦ | 5 nm | 10 nm | 15 nm | (×10,000/mm²) | (nm) | (GPa) |
| Example 7 | 860 | 280 | 44 | 0 | 8.2 | 2.2 | 0.3 | — | — | 13.2 |
| Example 8 | 1200 | 400 | 62 | 1 | 7.9 | 2.5 | 0.4 | 17 | 65 | 13.1 |
| Example 9 | 520 | 400 | 220 | 0 | 13.5 | 7.6 | 2.7 | — | — | 13.1 |
| Example 10 | 430 | 380 | 270 | 15 | 5.2 | 3.2 | 2.3 | — | — | 12.7 |
| Comparative example 5 | 54 | 4 | 0 | 0 | 0.5 | 0 | 0 | — | — | 13.2 |
| Comparative example 6 | 940 | 690 | 430 | 30 | 26.2 | 13.4 | 5.3 | — | — | 10.8 |

TABLE 10

| | Resistance to scraping | Film dust/ particle removal | Resistance to scratch | Output (dB) | Dropout (number/ min) | Durability |
|---|---|---|---|---|---|---|
| Example 7 | ◎ | ◎ | ○ | 2.2 | 0.3 | ○ |
| Example 8 | ◎ | ◎ | ○ | 1.7 | 0.6 | ○ |
| Example 9 | ○ | ○ | Δ | 1.9 | 0.3 | ○ |
| Example 10 | ○ | ○ | Δ | −0.7 | 1.3 | Δ |
| Comparative example 5 | Δ | X | X | 0.8 | 0.4 | X |
| Comparative example 6 | X | X | X | −2.4 | 4.2 | X |

EXAMPLE 11

Colloidal silica with a primary particle diameter of [30] *80* nm was dispersed adequately in NMP and added to aromatic polyamide up to 0.02 wt %, followed by polymerization by the same procedure as in Example 1. The resultant solution was blended with a PES solution as in Example 1 to produce a mixed solution, which was filtered through filters with filtering accuracy of 5,000 nm and 1,000 nm, and, while being kept at 60° C., cast onto an endless belt that had surface defects of 30 [cm] *μm* or more in diameter at a rate of 0.005/mm². At the time of casting, the temperature of the support, Tb, and the temperature of hot air, Ta, were 120° C. and 150° C., respectively. The desolvating rate was 8.5%/min. After being peeled off from the belt, the film was then immersed in a water bath at 40° C. for 5 minutes, dried at 160° C. for 30 seconds, and heat-treated in 250° C. hot air of a flow speed of 3 m/sec to produce aromatic polyamide film of 4.3 μm in thickness. During the film production process, the film was stretched up to the ratio, 1.2 and 1.3 in the machine direction and the transverse direction, respectively.

Production conditions and film properties are shown in Tables 11 to 15.

EXAMPLE 12

Polymerization was performed to produce a mixed solution by the same procedure as in Example 11 except that colloidal silica with a primary particle diameter of 50 nm was added up to 0.005 wt % relative to aromatic polyamide and that PES was added up to 6 wt % relative to aromatic polyamide. The mixed solution thus obtained was filtered through filters with filtering accuracy of 5,000 nm and 1,000 nm, and, while being kept at 60° C., cast onto an endless belt that had surface defects of 30 [cm] *μm* or more in diameter at a rate of 0.005/mm². At the time of casting, the temperature of the support, Tb, and the temperature of hot air, Ta, were 120° C. and [150° C.] *170° C.*, respectively. The desolvating rate was [8.5%/min] *7.2%/min*. After being peeled off from the belt, the film was then immersed in a water bath at 40° C. for 5 minutes, dried at 160° C. for 30 seconds, and heat-treated in 250° C. hot air of a flow speed of 6 m/sec to produce aromatic polyamide film of 4.3 μm in thickness. During the film production process, the film was stretched up to the ratio, 1.2 and 1.3 in the machine direction and the transverse direction, respectively.

Production conditions and film properties are shown in Tables [a] 11 to 15.

Comparative example 7

Using the mixed solution prepared in Example 1, aromatic polyamide film of 4.3 μm in thickness was produced by the same procedure as in Example 1 except that heat treatment was performed at a flow speed of 35 m/sec. The surface of this film was so rough with numerous crater-like irregularities that is was impossible to count the number of protrusions.

Production conditions and film properties are shown in Tables [10]*11* to 15.

TABLE 11

| | Dissimilar polymer or particle | Content (wt %) | δa [(MJ/mm$^3$)$^{1/2}$] *(MJ/m$^3$)$^{1/2}$* | δb (MJ/m$^3$)$^{1/2}$ | \|δa-δb\| (MJ/m$^3$)$^{1/2}$ | [Content (wt] [%)] *Polymer temp. at casting* (° C.) | Hot air temp. Ta (° C.) | Support temp. Tb (° C.) |
|---|---|---|---|---|---|---|---|---|
| Example [1] *11* | PES | 3 | 56.6 | 53.6 | 3.0 | 60 | 150 | 120 |
| | colloidal silica | 0.02 | | | | | | |
| Example 12 | PES | 6 | 56.6 | 53.6 | 3.0 | 60 | 170 | 120 |
| | colloidal silica | 0.005 | | | | | | |
| Comparative example 7 | PES | 3 | 56.6 | 53.6 | 3.0 | 60 | 170 | 140 |

TABLE 12

| | Desolvating rate (%/min) | Drying temp. (° C.) | Heat treatment temp. (° C.) | Heat treatment air speed (m/sec) | Stretching ratio in machine direction | Stretching ratio in transverse direction |
|---|---|---|---|---|---|---|
| Example 11 | 8.5 | 220 | 250 | 3 | 1.1 | 1.4 |
| Example 12 | 7.2 | 220 | 250 | 6 | 1.1 | 1.4 |
| Comparative example 7 | 11.5 | 220 | 280 | 35 | 1.2 | 1.3 |

TABLE 13

| | Rq (nm) | Rz (nm) | Ra (nm) | Rt (nm) | Rt/Ra | Non-particle index (%) | HD [(nm)] | Average protrusion diameter (nm) |
|---|---|---|---|---|---|---|---|---|
| Example 11 | 1.7 | 18.5 | 1.2 | 17.8 | 14.8 | 99 | 0.03 | 70 |
| Example 12 | 2.7 | 24.2 | 1.8 | 30.4 | 16.9 | 99 | 0.10 | 140 |
| Comparative example 7 | 1.2 | 12.1 | 1.0 | 12.5 | 12.5 | 100 | — | — |

*Comparative example 7: Heavy roughness due to crater-like dents was seen all over the surface.

TABLE 14

| | No. of protrusions (×10,000/mm$^2$) | | | | Cross-section (%) | | | Particle protrusions | | Young's modulus (GPa) | Elongation (%) |
|---|---|---|---|---|---|---|---|---|---|---|---|
| | 5 nm≦ | 10 nm≦ | 15 nm≦ | 50 nm≦ | 5 nm | 10 nm | 15 nm | Number (×10,000/mm$^2$) | Height (nm) | MD/TD | MD/TD |
| Example 11 | 800 | 170 | 12 | 0 | 2.4 | 0.3 | 0.01 | 2.2 | 38 | 11.3/18.2 | 50/38 |
| Example 12 | 690 | 280 | 20 | 0 | 6.5 | 1.8 | 0.02 | 0.7 | 31 | 11.6/17.3 | 55/31 |
| Comparative example 7 | — | — | — | — | — | — | — | — | — | 12.7/12.8 | 48/50 |

MD: machine direction
TD: transverse direction

TABLE 15

| | Resistance to scraping | Film dust/ particle removal | Resistance to scratch | Output (dB) | Dropout (number/ min) | Durability |
|---|---|---|---|---|---|---|
| Example 11 | ◎ | ◎ | ○ | 3.1 | 0.1 | ○ |
| Example 12 | ◎ | ◎ | ○ | 2.9 | 0.3 | ○ |
| Comparative example 1 | X | Δ | X | −0.8 | 2.5 | X |

INDUSTRIAL APPLICABILITY

The invention provides aromatic polyamide resin moldings whose surface have protrusions that are virtually uniform, fine, and so high in affinity with aromatic polyamide that they [are hard to be destroyed] *resist destruction*.

Further, the invention provides aromatic polyamide film that, when used as base film for a magnetic recording medium, are [excel lent] *excellent* in electromagnetic conversion properties and durability.

What is claimed is:

1. Aromatic polyamide resin molding comprising at least one surface that has an $R_q$ root-mean-square roughness of 1.0 nm or more and a 10-point average roughness of 80 nm or less, both of said roughness being as determined by atomic force microscopy, and said molding having a tensile Young's modulus of at least 9.8 Gpa or more in at least one direction, in which said aromatic polyamide layer that comprises said surface consist essentially of an aromatic polyamide plus a dissimilar polymer that is not an aromatic polyamide, and wherein said dissimilar polymer comprises 0.1 wt % to 10 wt %, where H/D is the value given by dividing the average height of the protrusions on the surface by the average diameter of the protrusions and wherein H/D is in the range of 1/40 to 1/2, and wherein the average diameter of the protrusions on the surface is 30 nm to 300 nm.

2. Aromatic polyamide resin molding as defined in claim 1, wherein the height of highest non-particle protrusion on the surface of said molding is 20 times or less the average roughness of said surface.

3. Aromatic polyamide resin molding as defined in claim 1, which number of protrusions that are 5 nm or more in height that are formed on said surface is $2\times10^5/mm^2$ or more.

4. Aromatic polyamide resin molding as defined in claim 3, which the number of protrusions that are 50 nm or more in height is $2\times10^5/mm^2$ or less, and cross section of said protrusions taken in a horizontal plane at a height of 5 nm above said surface comprises 1–20% of the total area of said surface.

5. Aromatic polyamide resin molding defined in claim 1, in which number of particle protrusions on said surface is $0.1\times10^4/mm^2$ to [$20\times10^4/mm^2$] $20\times10^4/mm^2$.

6. Aromatic polyamide resin molding defined in claim 5, in which average height of said particle protrusions on the surface of said molding is 10 nm to 75 nm.

7. Aromatic polyamide resin molding as defined in claim 6, in which said particle protrusions comprise an inorganic substance.

8. Aromatic polyamide resin molding as defined in claim 1, including said dissimilar polymer that is not an aromatic polyamide, and in which the solubility parameter of said aromatic polyamide, 6a, and the solubility parameter of said dissimilar polymer, 6b, satisfy the following formulae:

$$50(MJ/m^3)^{1/2} \leqq \delta a \leqq 70(MJ/m^3)^{1/2}$$

$$[|\delta a-\delta b| \leqq (MJ/m^3)^{1/2}]\ |\delta a-\delta b| \leqq 20(MJ/m^3)^{1/2}.$$

9. Aromatic polyamide resin molding as defined in claim 1, in which said aromatic polyamide layer that comprises said surface consists essentially of an aromatic polyamide plus a dissimilar polymer that is not an aromatic polyamide[.] and wherein said dissimilar polymer comprises 0.1 wt % to 10 wt % of the total of the aromatic and the dissimilar polymer, in which said dissimilar polymer is selected from the group consisting of at least one of the following polymers: polysulfone, polyetherimide, polyphenylene oxide, polyketone, polycarbonate, polyester, and polyimide.

10. Aromatic polyamide resin molding as defined in claim 9, in which said dissimilar polymer is polysulfone.

11. Aromatic polyamide resin molding as defined in claim 1, further comprising a plurality of particles in an amount of 0.0001 wt % to 1.0 wt %.

12. Aromatic polyamide resin molding as defined in claim 1, in which said moldings are in the form of a film.

13. Method for producing a magnetic recording medium as defined in claim 12, in which an aprotic organic polar solution of an aromatic polyamide and a dissimilar polymer is cast onto the form of support, dried at a desolvating rate of 3–15 %/min, and immersed in a water bath, followed by drying and/or heat treatment in a temperature range whose maximum is not less than the glass transition temperature of said dissimilar polymer and not more than said glass transition temperature plus 100° C., with the flow speed of air at said film surface being 1 m/sec to 30 m/sec.

14. Magnetic recording medium that is produced by forming a magnetic layer over at least one surface of said aromatic polyamide resin molding as defined in claim 1.

15. Magnetic recording medium as defined in claim 14, in which said magnetic layer is a thin metal magnetic layer.

16. Magnetic recording medium as defined in claim 14, in the form of a magnetic tape of 2, 3–13 mm in width, 6.5 μm or less in support thickness, 100 m/roll or more in length, and 8 $KB/mm^2$ or more in recording density.

17. An aromatic polyamide resin molding comprising at least one surface that has a root-mean-square roughness of 1.0 nm or more and a 10-point roughness of 80 nm or less, both of said roughness being as determined by atomic force microscopy, and said molding having a tensile Young's modulus of at least 9.8 Gpa or more in at least one direction wherein said molding further has a non-particle index of 80% or more for protrusions 5 nm or more in height on its surface, and wherein said molding has a value of 1/40 to 1/2 obtained by dividing the average height of the protrusions on the molding surface by the average diameter of the protrusions.

18. An aromatic polyamide resin molding comprising at least one surface that has an $R_q$ root-mean-square roughness of 1.0 nm or more and a 10-point average roughness of 80 nm or less, both of said roughness being as determined by atomic force microscopy, and said molding having a tensile Young's modulus of at least 9.8 GPa or more in at least one direction wherein said molding further has a non-particle index of 80% or more for [protusions] *protrusions* 5 nm or more in height, on its surface, and wherein the average diameter of the protrusions on said surface is 30 nm to 300 nm, and wherein the height of the highest non-particle [protusion] *protrusion* on the surface of said molding is 20 times or less of the average roughness of said surface, and wherein the number of protrusions that are 5 nm or more in height that are formed on said surface is $2\times10^5/mm^2$ or more, and the cross sections of said protrusions, taken in a horizontal plane at a height of 5 nm above said surface comprises 1 to 20% of the total area of said surface, and wherein the average height of said particle protrusions on the surface of said moldings is 10 nm to 75 nm, said protrusions having an H/D ratio in the range of 1/40 to 1/2 herein H represents the average height and D represents the average diameter of said protrusions, and wherein said aromatic polyamide layer that comprises said surface consists essentially of an aromatic polyamide plus a dissimilar polymer that is not an aromatic polyamide, and wherein said dissimilar polymer comprises 0.1 wt % to 10 wt % of the total of the aromatic and the dissimilar polymers.

19. An aromatic polyamide resin molding comprising at least one surface that has an Rq root-mean-square roughness of 1.0 nm or more and a 10-point average roughness of 80 nm or less, both of said roughnesses being as determined by atomic force microscopy and said molding having a tensile Young's modulus of at least 9.8 Gpa or more in at least on direction, in which said aromatic polyamide layer that comprises said surface contains an aromatic polyamide plus a dissimilar polymer that is not an aromatic polyamide, where H/D is the value given by dividing the average height of the protrusions on the surface by the average diameter of the protrusions and wherein H/D in the range of 1/40 to 1/2, wherein the average diameter of the protrusions on the surface is 30 nm to 300 nm.

20. Aromatic polyamide resin molding as defined in claim 1 or in claim 19, wherein said dissimilar polymer is an aromatic polysulfon polymer which comprises one or more repeating units represented by a formula selected from the following group:

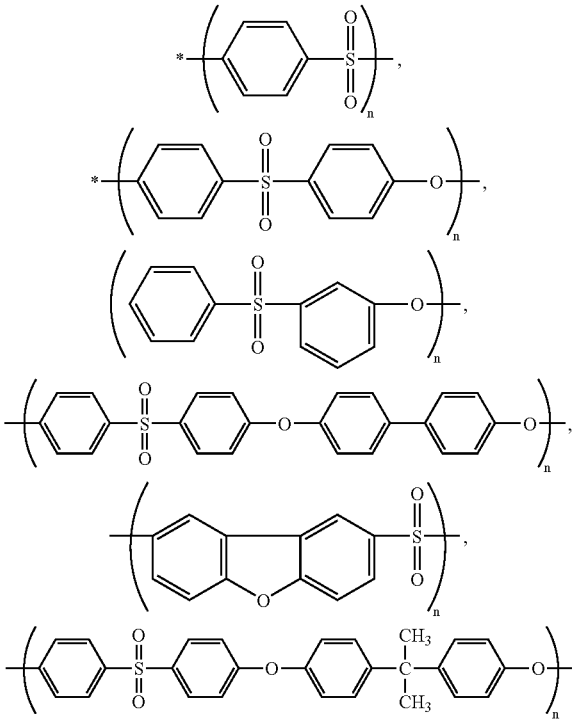

wherein n denotes a positive integer.

* * * * *